(12) United States Patent
Fitzpatrick et al.

(10) Patent No.: US 8,359,231 B2
(45) Date of Patent: Jan. 22, 2013

(54) METHOD AND SYSTEM FOR ELECTRONICALLY SELECTING, MODIFYING, AND OPERATING A MOTIVATION OR RECOGNITION PROGRAM

(75) Inventors: Brian Fitzpatrick, Fenton, MO (US); Ellen Cox, Fenton, MO (US); Maddy Sheprow, Fenton, MO (US); Peggy Barton, Fenton, MO (US); Frank Munsch, Fenton, MO (US); Mark Hanes, Fenton, MO (US); Jennie Hei, New York, NY (US); Ethan Blumenstrauch, New York, NY (US)

(73) Assignee: Maritz Holdings Inc., Fenton, MO (US)

( * ) Notice: Subject to any disclaimer, the term of this patent is extended or adjusted under 35 U.S.C. 154(b) by 3211 days.

(21) Appl. No.: 09/840,648

(22) Filed: Apr. 23, 2001
(Under 37 CFR 1.47)

(65) Prior Publication Data
US 2002/0046138 A1   Apr. 18, 2002

Related U.S. Application Data

(60) Provisional application No. 60/204,461, filed on May 16, 2000.

(51) Int. Cl.
 *G06Q 30/00* (2012.01)
(52) U.S. Cl. ............... 705/14.27; 705/14.1; 705/1.1; 705/26.5
(58) Field of Classification Search ............ 705/14, 705/14.1, 14.27, 26.5, 1.1
See application file for complete search history.

(56) References Cited

U.S. PATENT DOCUMENTS

| 4,703,423 A | 10/1987 | Bado et al. |
| 4,982,346 A | 1/1991 | Girouard et al. |
| 5,025,372 A | 6/1991 | Burton et al. |
| 5,053,955 A | 10/1991 | Peach et al. |
| 5,231,568 A | 7/1993 | Cohen et al. |
| 5,239,460 A | 8/1993 | LaRoche |
| 5,245,533 A | 9/1993 | Marshall |
| 5,319,542 A | 6/1994 | King, Jr. et al. |
| 5,321,604 A | 6/1994 | Peach et al. |
| 5,774,870 A | 6/1998 | Storey |
| RE36,116 E | 2/1999 | McCarthy |
| 5,893,075 A | 4/1999 | Plainfield et al. |
| 5,907,831 A | 5/1999 | Lotvin et al. |

(Continued)

FOREIGN PATENT DOCUMENTS
WO   WO 96/29668 A1   9/1996

(Continued)

OTHER PUBLICATIONS

Symons and Jacobs, "A Total Quality Management-Based Incentive System Supporting Total Quality Management Implementation", Summer 1995, Production and Operations Management, vol. 4, No. 3, pp. 228-241.*
Hoffman and Rogelberg, "A guide to team incentive systems", 1998, Team Performance Management, v4n1, pp. 23.*

(Continued)

*Primary Examiner* — John Van Bramer
(74) *Attorney, Agent, or Firm* — Senniger Powers LLP

(57) ABSTRACT

A system and method for allowing multiple customers to each create an individual, modified motivation or recognition program having participants, each said motivation program permitting the participants to earn awards on the basis of the participants' performance, each said motivation program of a particular customer operating according to preferences selected by the particular customer.

15 Claims, 11 Drawing Sheets

U.S. PATENT DOCUMENTS

| | | | |
|---|---|---|---|
| 5,915,244 A * | 6/1999 | Jack et al. | 705/14 |
| 5,956,693 A | 9/1999 | Geerlings | |
| 5,956,695 A | 9/1999 | Carrithers et al. | |
| 5,970,475 A | 10/1999 | Barnes et al. | |
| 6,009,412 A | 12/1999 | Storey | |
| 6,055,511 A | 4/2000 | Luebbering et al. | |
| 6,061,660 A * | 5/2000 | Eggleston et al. | 705/14.12 |
| 6,424,951 B1 | 7/2002 | Shurling et al. | |
| 6,564,189 B1 | 5/2003 | Nycz | |

FOREIGN PATENT DOCUMENTS

| | | | |
|---|---|---|---|
| WO | WO 00/79459 A2 | 12/2000 | |

OTHER PUBLICATIONS

Symons and Jacobs, "A Total Quality Management-Based System Supporting Total Quality Management Implementation", Summer 1995, Production and Operations Management, vol. 4, No. 3, pp. 228-241.*

Salesdriver.com, "Build New Contest," Available at http://www.salesdriver.com, Apr. 5, 2000, USA, 5 pages.

Ali Arsanjani, "Service Provider: A Domain Pattern and Its Business Framework Implementation," presented to Plop 1999 conference, 24 pages.

* cited by examiner

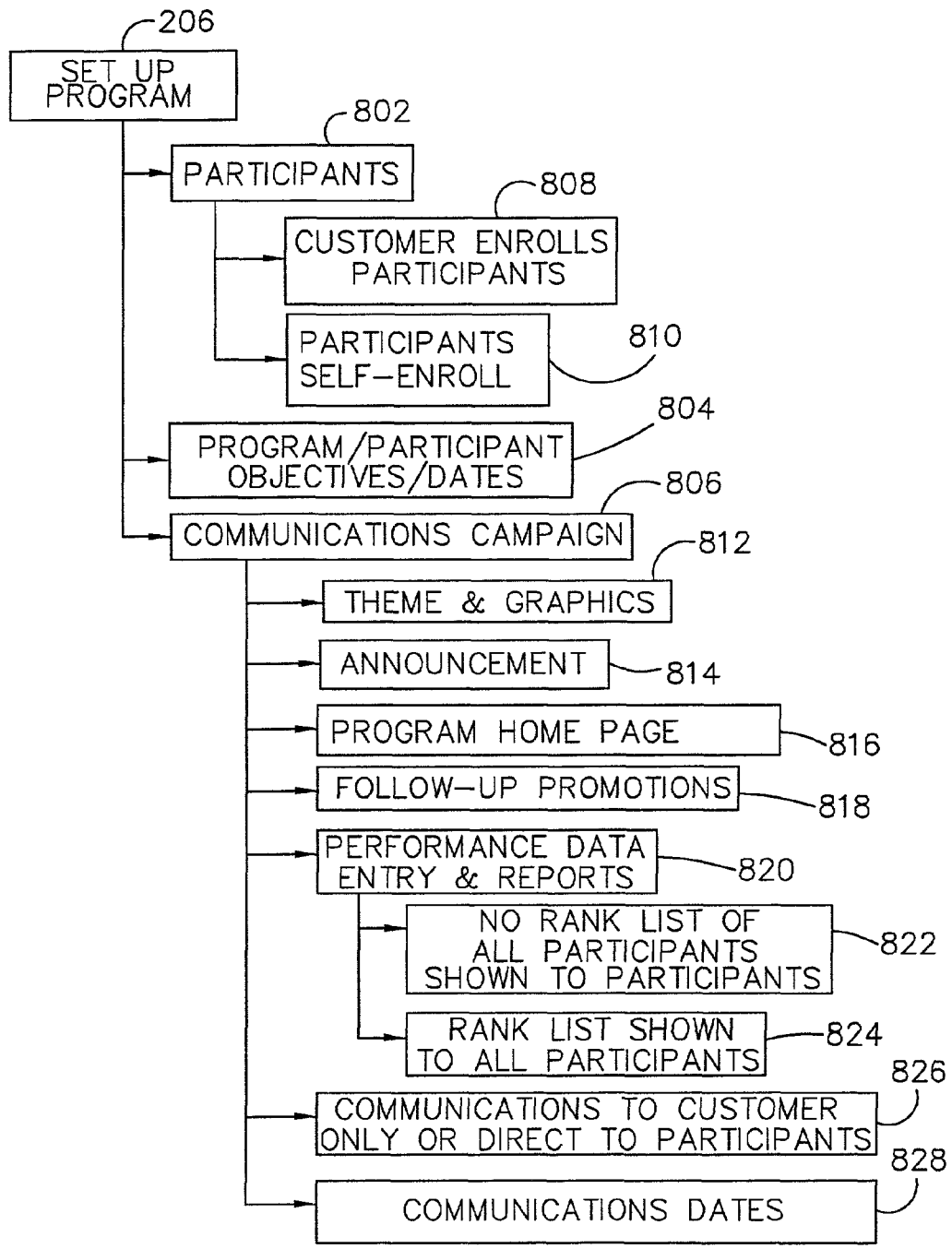

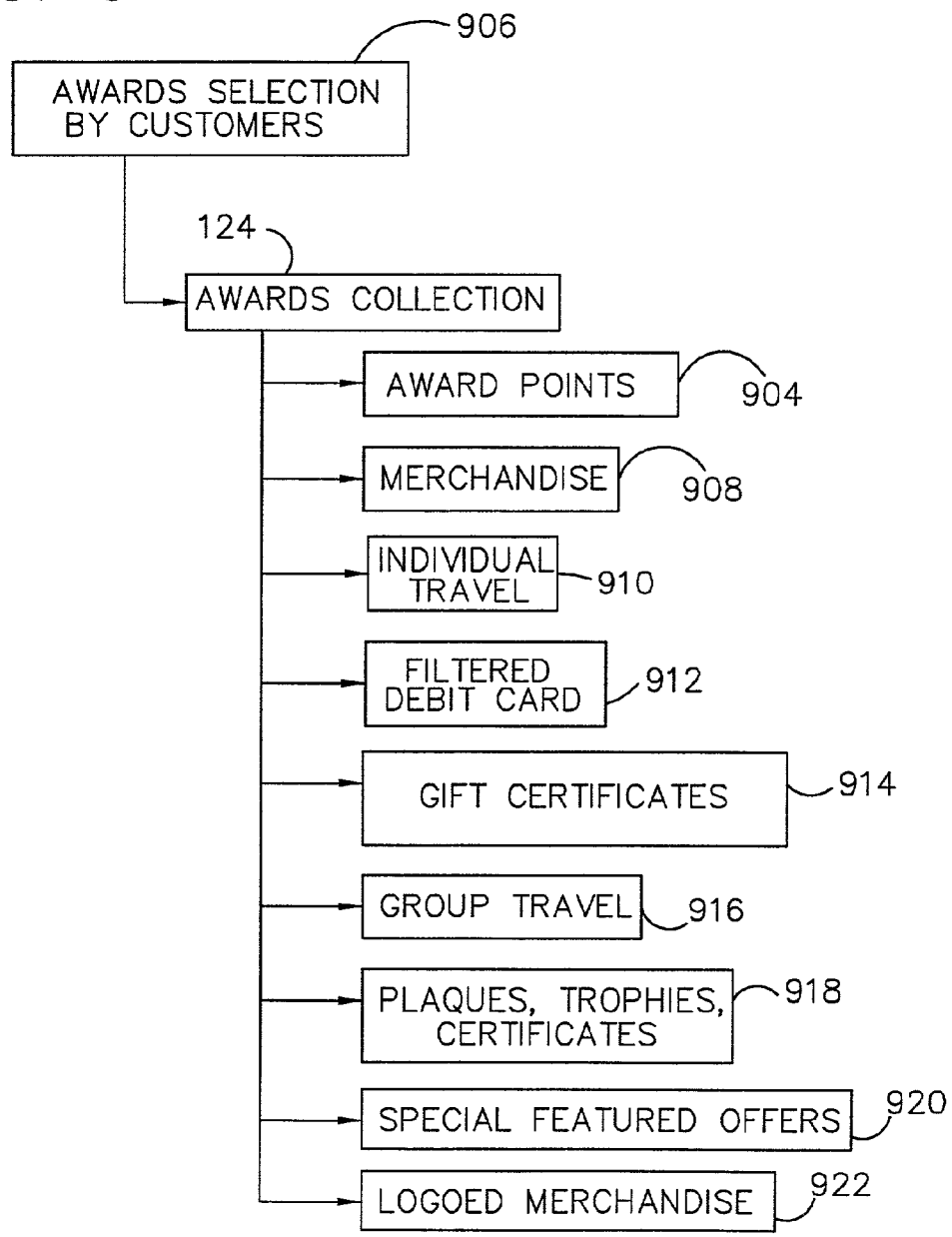

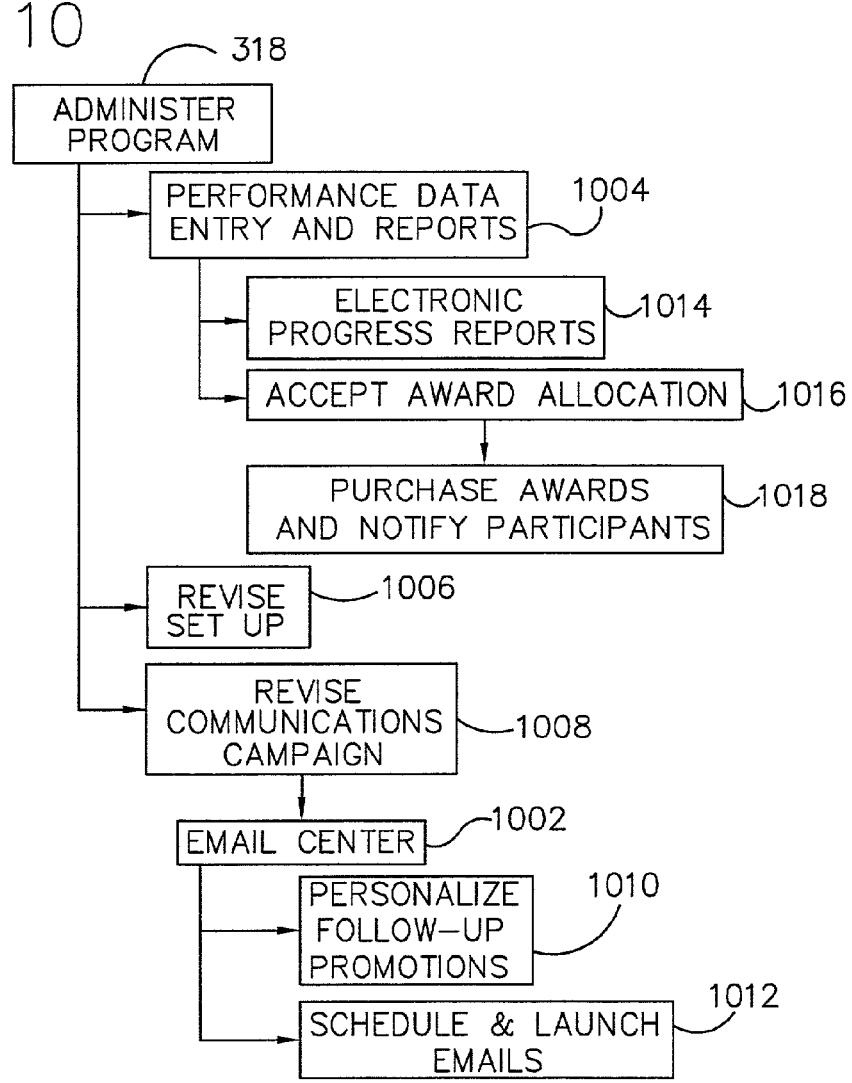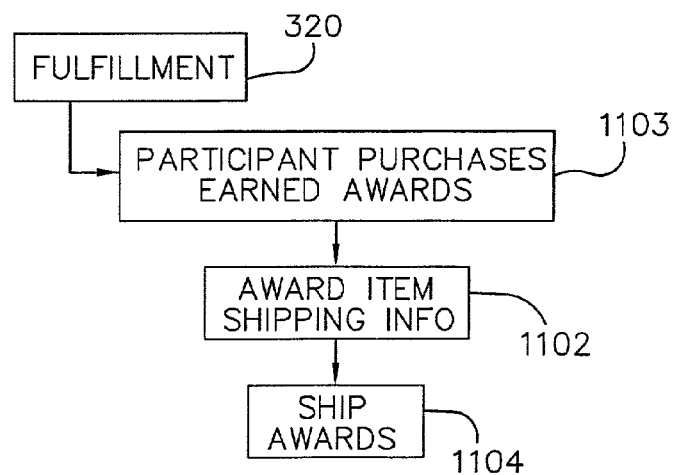

METHOD AND SYSTEM FOR ELECTRONICALLY SELECTING, MODIFYING, AND OPERATING A MOTIVATION OR RECOGNITION PROGRAM

CROSS REFERENCE TO RELATED APPLICATION

This application is based upon U.S. Provisional Patent Application Ser. No. 60/204,461, entitled METHOD AND SYSTEM FOR ELECTRONICALLY SELECTING, MODIFYING, AND OPERATING A MOTIVATION AWARDS PROGRAM, filed May 16, 2000, naming Fitzpatrick et al. as inventors. The entirety of such provisional patent application is incorporated by reference herein.

NOTICE

Copyright© 2000, 2001 Maritz Inc. A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to the field of motivation and recognition programs. In particular, this invention relates to a method and system which allows multiple customers to each create an individual, modified program from a catalog of predefined programs and/or through a process that asks the customer to answer a series of questions which results in the modified program.

2. Description of the Prior Art

Motivation and recognition programs (hereinafter, "programs") provide companies or resellers (hereinafter, "customers") with a method for attracting, retaining, rewarding, and recognizing employees, members, volunteers, contractors, distribution-channel personnel, and consumers (hereinafter, "participants"). For more information regarding such programs, refer to: FILTER PROCESSOR AND METHOD FOR IMPLEMENTING A PROGRAM, U.S. Pat. No. 5,956,695 by Carrithers et al., assigned to Maritz Inc., incorporated herein by reference.

The business-to-business customer may prefer a do-it-yourself approach to programs. Programs are available to customers as either standard, "off-the-shelf" programs or customized programs to suit the particular needs of a business. Such programs currently exist in the marketplace. For example, Maritz Inc. provides programs for customers offline; that is, by conversing with the customer and then designing, implementing, and operating a program for that customer based on the expressed needs of that customer. For the customer who prefers a do-it-yourself approach, some systems offer software that runs on a personal computer and allows the customer to design, set up, and/or operate a program according to customer-selected preferences.

However, there is a need for a system which allows customers, via a customer processor connected to a global computer network, to select a program from a plurality of predefined programs and to modify and operate the selected, predefined program.

In addition, there is a need for such a system which allows customers to significantly modify the predefined programs. Further, there is a need for a system to offer predefined programs directed at a variety of program types including, but not limited to, sales contests. There is also a need for a system that allows customers to save and print a proposal and invoice for their modified programs for offline decision-making. In addition, there is a need for a system which offers time-phased and/or activity-phased payments for the purchase of programs. There is also a need for a system to offer communications campaigns for programs that include libraries of themes, graphics, and photography with multiple levels of communications elements. There is also a need for a system to offer expert consulting for programs in which appointments are completed via telephone or online using a network, such as a global computer network. There is also a need for a system to offer a range or library of distinct award options to the customer for browsing, selecting, modifying, and purchasing according to the customer's needs.

SUMMARY OF THE INVENTION

It is an object of this invention to provide a method and system which allows multiple customers to select an individual program from various programs, to modify the selected program, to save the modified program, to purchase the modified program, and to set up and operate the modified program.

It is another object of this invention to electronically provide to the customer a browsable catalog of predefined programs.

It is another object of this invention to provide a method and system which offers predefined programs directed at a variety of program types including sales contests.

It is another object of this invention to allow the customer to select via a customer processor one of the predefined programs.

It is another object of this invention to provide a method and system which allows customers to significantly modify the predefined programs.

It is another object of this invention to provide a method and system which offers a range or library of distinct award options to the customer for browsing, selecting, modifying, and purchasing according to the customer's needs.

It is another object of this invention to allow the customer to modify via a customer processor one or more of the components of the selected, predefined programs.

It is another object of this invention to provide a method and system that allows customers to save and print a proposal and invoice for their modified programs for offline decision-making.

It is another object of this invention to provide a method and system which offers time-phased and/or event-phased payments for the purchase of programs.

It is another object of this invention to provide a method and system which offers communications campaigns for programs that include libraries of themes, graphics, and photography with multiple levels of communication elements.

It is another object of this invention to allow the customer to set up the program by selecting the program start date, editing the communication content including photography and copy, reviewing pre-set communication dates and modifying them, inputting company graphics/logos, requesting that the system automatically send the announcement and other communications to participants or to the customer only, assigning program objectives (individual or global) and enrolling program participants.

It is another object of this invention to allow the customer to operate via a customer processor the modified program.

It is another object of this invention to allow the customer to track and report participant activity within the modified program including the generation of management summary reports and individual participant performance reports.

It is another object of this invention to allow the participants to earn awards of various types preselected by the customer (which may include award points redeemable for award items).

It is another object of this invention to provide a method and system which offers expert consulting for programs in which appointments are completed via telephone or online using a network, such as a global computer network.

In one form, the invention includes a method for allowing multiple customers to each create an individual, modified motivation or recognition program having participants. Each program permits the participants to earn awards on the basis of the participants' performance. Each program of a particular customer operates according to preferences selected by the particular customer. The method comprises the steps of:

allowing each customer to electronically access via a customer processor a browsable catalog of predefined programs stored in a storage device;

allowing each customer to electronically select via the customer processor one of the predefined programs stored in the storage device;

allowing each customer to electronically modify via the customer processor at least one component of the selected predefined program;

allowing each customer to electronically store via the customer processor the modified program in the storage device for access by such customer;

allowing each customer to operate the modified program; and providing each customer's participants with access via a participant processor to the modified program stored in the storage device.

In another form, the invention includes a system for allowing multiple customers to each create an individual, modified motivation or recognition program having participants. Each program permits the participants to earn awards on the basis of the participants' performance. Each program of a particular customer operates according to preferences selected by the particular customer. The system comprises a storage device and a program processor connected to the storage device. The storage device stores a program for controlling the program processor. The program processor is operative with the program:

to electronically provide to each customer access to a browsable catalog of predefined programs stored in the storage device;

to allow each customer to electronically select one of the predefined programs stored in the storage device;

to allow each customer to modify at least one component of the selected predefined program;

to allow each customer to electronically store the modified program in the storage device for access by such customer;

to allow each customer to electronically create or review a proposal and/or invoice relating to the modified program;

to allow each customer to operate the modified program; and to provide each customer's participants with access to the modified program stored in the storage device.

In another form, the invention includes a method of allowing multiple customers to create individual, modified motivation or recognition programs having participants. The programs permit the participants to earn awards on the basis of performance. The programs operate according to customer-selected preferences. The method comprises the steps of:

electronically providing a selection system which allows each customer access via a customer processor to a browsable catalog of predefined programs stored in a storage device, and allowing such customer to electronically select via the customer processor one of the predefined programs stored in the storage device;

electronically providing a modification system which allows each customer to modify via the customer processor at least one component of the selected predefined program;

electronically providing a storage system which allows each customer to store via the customer processor the modified program in the storage device for access by such customer; and electronically providing a transaction system which provides each customer's participants with access via a participant processor to the modified program stored in the storage device.

In another form, the invention includes a method for allowing multiple customers to each create an individual, modified motivation or recognition program having participants. Each program permits the participants to earn awards on the basis of the participants' performance. Each program of a particular customer operates according to preferences selected by the particular customer. The method comprises the steps of:

electronically providing a series of grouped questions via a customer processor to each customer;

electronically allowing each customer to respond via the customer processor to the questions;

providing to each customer via the customer processor access to a modified program based on each customer's responses to the questions;

allowing each customer to operate via the customer processor the modified program; and providing each customer's participants with access to the modified program.

In another form, the invention includes a system for allowing multiple customers to each create an individual, modified motivation or recognition program having participants. Each program permits the participants to earn awards on the basis of the participants' performance. Each program of a particular customer operates according to preferences selected by the particular customer. The system comprises a storage device, a customer processor, selecting software, editing software, and operating software. The storage device stores a browsable catalog of predefined programs. The customer processor accesses the stored browsable catalog. The selecting software allows each customer to select via the customer processor one of the predefined programs. The editing software allows each customer to modify via the customer processor at least one component of the selected predefined program. The operating software allows each customer to operate via the customer processor the modified program.

Other objects and features will be in part apparent and in part pointed out hereinafter.

BRIEF DESCRIPTION OF THE DRAWINGS

FIG. 8 is a block diagram of an aspect of the system of the invention in which the customer sets up the modified program by enrolling participants, outlining program objectives, editing themes, graphics, and communications content, and establishing performance data entry and report parameters.

FIG. 9 is a block diagram of an aspect of the system of the invention in which the customer selects the award type available in the modified program.

FIG. 10 is a block diagram of an aspect of the system of the invention in which the customer administers operation of the modified program.

FIG. 11 is a block diagram of an aspect of the system of the invention in which award item redemption requests are fulfilled.

DETAILED DESCRIPTION OF PREFERRED EMBODIMENTS

Figure 1:
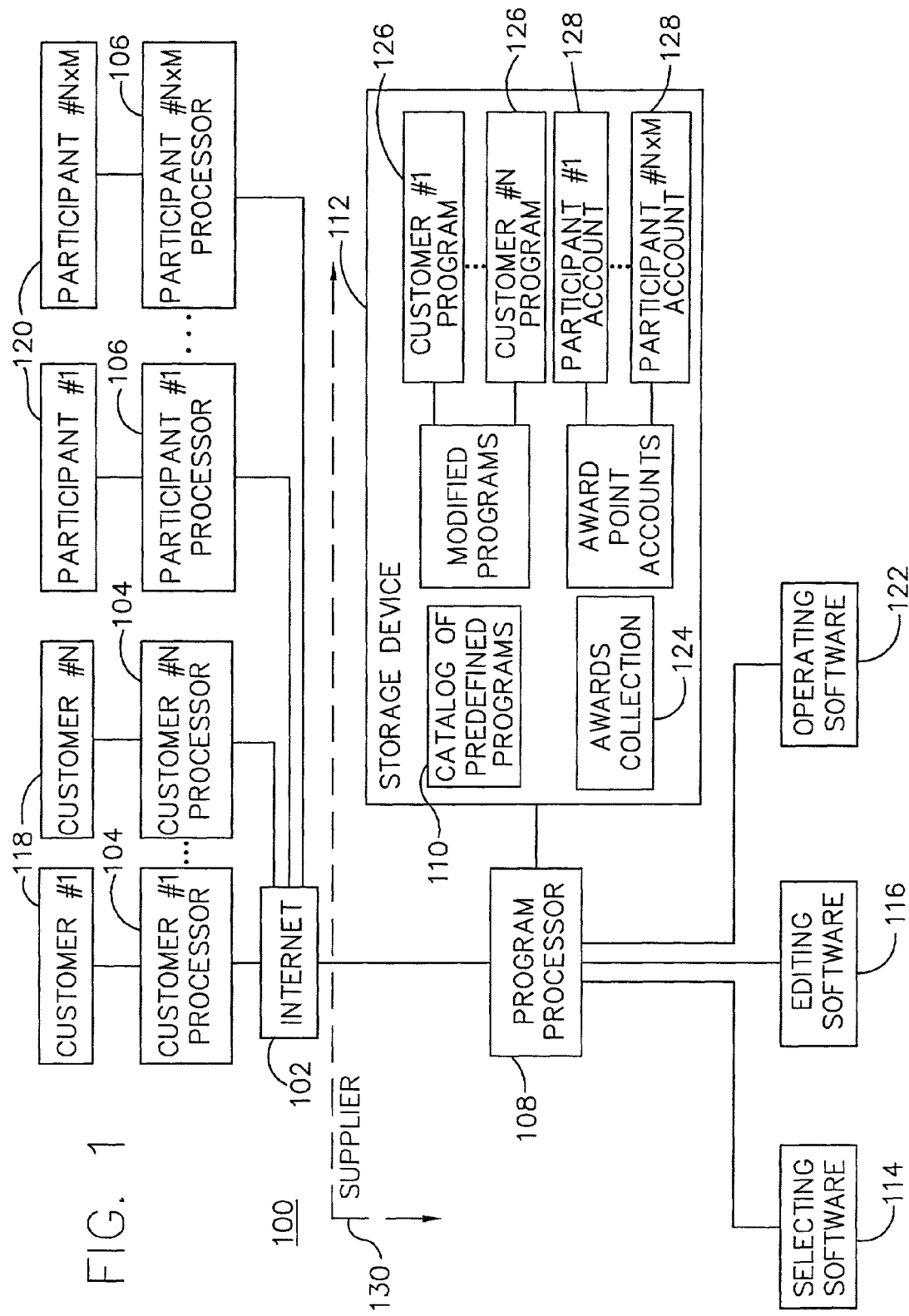
FIG. 1 is a block diagram of one preferred embodiment of the system of the invention illustrating the main aspects.

Referring to FIG. 1, a block diagram of one embodiment of the invention illustrates the main aspects of the invention. In general, the invention is a method and system (hereinafter referred to as "system 100") provided by a supplier 130 which allows multiple customers 118 to each create an individual, modified program (see reference character 126, below). Each customer 118 is generally a business or other entity having a plurality of participants such as employees, contractors, members, volunteers, distribution-channel people or other consumers. The customer 118 is interested in providing awards to these employees, its contractors and/or others (e.g., its consumers) to encourage certain activities or performance. The desired performance includes, but is not limited to, achieving sales quotas, reaching a service anniversary date, or acquiring new skills. The awards include, but are not limited to, the issuance of selected award items or the allocation of award points 904 (see FIG. 9) which can be redeemed for the award items. Therefore, the customer 118 selects some of these employees, contractors, or others to participate in a program so that the selected employees, contractors, or others are known as participants 120. As shown in FIG. 1, N customers 118 would be part of the system 100 and each customer 118 may have up to M participants 120 so that there is a total of N×M participants 120. Although there are many ways to allow the customers 118 and participants 120 to access the programs provided by the supplier 130, one embodiment is through an Internet 102 or other network. Each customer 118 would employ a customer processor 104 and each participant 120 would employ a participant processor 106. The customer processor 104 and the participant processor 106 include, but are not limited to, personal computers, Internet devices, personal digital assistants, telephones, or interactive video or data devices. Remote from the customers 118 and participants 120, the supplier 130 would have a program processor 108 accessible via the Internet 102 or other network. The program processor 108 permits each customer 118 to electronically access a browsable catalog 110 of predefined programs (see FIG. 4, reference character 416) stored in a storage device 112 such as a hard drive or other memory. The predefined programs 416 have predefined components including the rules structures, library of themes and graphics, a photography library, suggested communications campaigns, and suggested awards.

Figure 2:
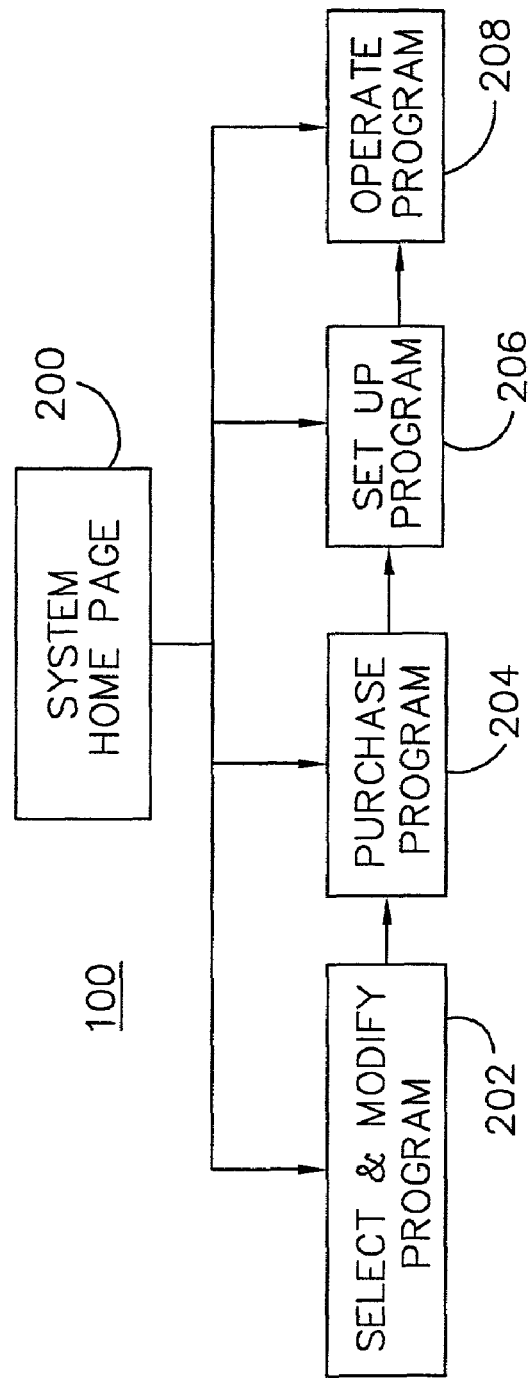
FIG. 2 is a block diagram of one preferred embodiment of the method of the invention illustrating the main aspects.

Referring to FIGS. 1 and 2, using its processor 104 and selecting software 114 which is available via the program processor 108, each customer 118 would electronically select at 202 one of the predefined programs 416 stored in storage device 112. Optionally, the customer 118 could use editing software 116 to modify at 306 (FIG. 3) one or more components of the selected program and store the modified program 126 for that customer 118 in a designated area of the storage device 112. Each customer 118 would have its own storage area so that, for example, each customer 118 would store its modified program and associated information such as that which is used to generate a proposal or invoice in an area. Because there is a maximum of N customers, a maximum of N storage areas would be necessary to store each customer program. As part of the editing, each customer 118 might establish separate award point accounts 128 for each of its participants. Because there is a maximum of N×M participants, a maximum of N×M participant accounts is required. Each customer 118 would electronically set up at 206 and otherwise operate at 208 their modified program 126 using the customer's processor 104 and operating software 122. Participants 120 may via secure logon use their processors 106 to access a participant launch page 1414 or a program home page 1420, from either of which the participants 120 may be offered access to various information such as optional online award redemption catalogs from which the award items may be obtained by the participant 120. The award redemption catalog is available in the modified programs 126 that are based on the issuance of award points 904 to the participants 120. The participants 120 access the modified program 126 only after the modified program 126 has been purchased by the customer 118 associated with the participants 120. In one embodiment, the participant launch page 1414 and the program home page 1420 are implemented using a hypertext markup language and/or Active Server Pages.

In one embodiment of the invention, the customer processor 104 is remote from the program processor 108 and remote from the storage device 112. The selecting software 114, the editing software 116 and the operating software 122 are resident in the program processor 108. In one embodiment, the customer processor 104, the participant processor 106, and the program processor 108 are selectively interconnected via a global computer network, such as the Internet 102.

The system 100 contains an image of the operating software 122 which remains local to the program processor 108. When the program processor 108 receives a request from a particular participant to execute the modified program 126, an image of the modified program 126 is loaded into a local memory area for execution by the operating software. As the program processor receives subsequent requests from participants 120 to execute the modified program 126, additional images of the modified program 126 are loaded into the local memory area for execution by the operating software 122. In addition, the modified programs 126 remain local to the program processor 108 in the storage device 112. Once the customer 118 has purchased the modified program 126, the image of the operating software 122 executes all the modified programs 126. The modified programs 126 are not stand-alone instances of code which are executable outside of the program processor 108. The modified programs 126 are not distributed to the customer 118 for execution local to the customers 118. Instead, the operating software 122 has business logic which is applied to each modified program 126 in the storage device 112 to execute that modified program 126 according to customer-selected preferences. The operating software 122 is not distributed to the customer processor 104 or the participant processor 106.

In general, the system 100 of the invention is the system 100 for allowing multiple customers 118 via processors 104 to each create the individual, modified programs 126 having participants. For the modified programs 126 based on the awarding of award points 904, a particular participant via processor 106 redeems award points 904 awarded on the basis of the particular participant's performance and placed in his/her account 128. Each of the modified programs 126 of a particular customer operates according to preferences selected by the particular customer. The customer processor 104 can be part of a selection system comprising a computer connected to a global computer network such as the Internet 102. Each customer 118 can electronically modify at 504 (FIG. 5) via the customer processor 104 at least one component (see below) of the selected predefined program. This modification can occur via a modification system. Each customer 118 can electronically store the modified program 126 for future access by the customer 118. The modified program 126 can be stored in a storage system. The storage system can be the storage device 112 associated with the program processor 108, or other device such as a computer with a hard disk drive connected to a global computer network such as the Internet 102. Future access by the customer 118 includes the ability to modify at 504 the program components. For example, the customer 118 can store its modified program 126 while making offline decisions. The customer 118 later retrieves its modified program 126 and performs further modifications as necessary. Also, the customer 118 can create and receive (e.g., via electronic mail) a formatted proposal which may include an invoice for its modified program 126 for printing offline. For example, the system 100 would electronically mail the customer 118 the proposal and/or invoice as an electronic mail attachment in Microsoft Word format. The customer 118 can also enter participant 120 performance data, track, and manage the program 126 in the storage system.

Each customer 118 operates at 208 the modified program 126 by using the operating software 122 to reward participants 120 on the basis of each participant's performance. Alternatively, participants 120 in a group are rewarded on the basis of the performance of the group. In one embodiment, a manager override feature exists to allow the customer 118 to selectively award a manager of particular participants 120 based on some "override" percentage of the awards earned by the participants 120. Participants 120 receive award items or award points 904 redeemable for award items in the awards collection 124. Participants 120 have access to the modified program 126 via their participant processor 106. The participant processor 106 can be part of a transaction system comprising a computer connected to a global computer network such as the Internet 102. The electronic mail communications are sent to the participants 120 and the customer 118 via the transaction system.

The selection system, modification system, storage system, and transaction system can be selectively interconnected. In one embodiment, this interconnection occurs via a computer network. Further, the functionality of one or more of the systems may be shared partially or entirely by another system.

Referring to FIG. 2, a block diagram of one embodiment of the invention illustrates the main aspects of the system 100 according to the invention. Beginning at a system home page 200, the system 100 allows the customers 118 via their customer processor 104 to select and optionally modify at 202 the predefined program, purchase at 204 the selected and optionally modified program, set up at 206 the purchased program, and operate at 208 the set-up program.

Set up at 206 of the modified program 126 includes enrolling participants 120 at 802 (FIG. 8) (or allowing the participants 120 to self-enroll), defining program and participant objectives at 804 (FIG. 8), and modifying the communications campaign elements at 806 that were chosen prior to program purchase. Further, set up includes, but is not limited to, selecting a start date for the modified program 126, editing the recommended information (the "copy") relating to scheduled communications with the participants during program operation at 818, requesting that communications be sent to the participants or to the customer only, and downloading the customer's logo or other graphic element(s). The system 100 offers recommended text and dates that the customer 118 can modify.

Figure 3:
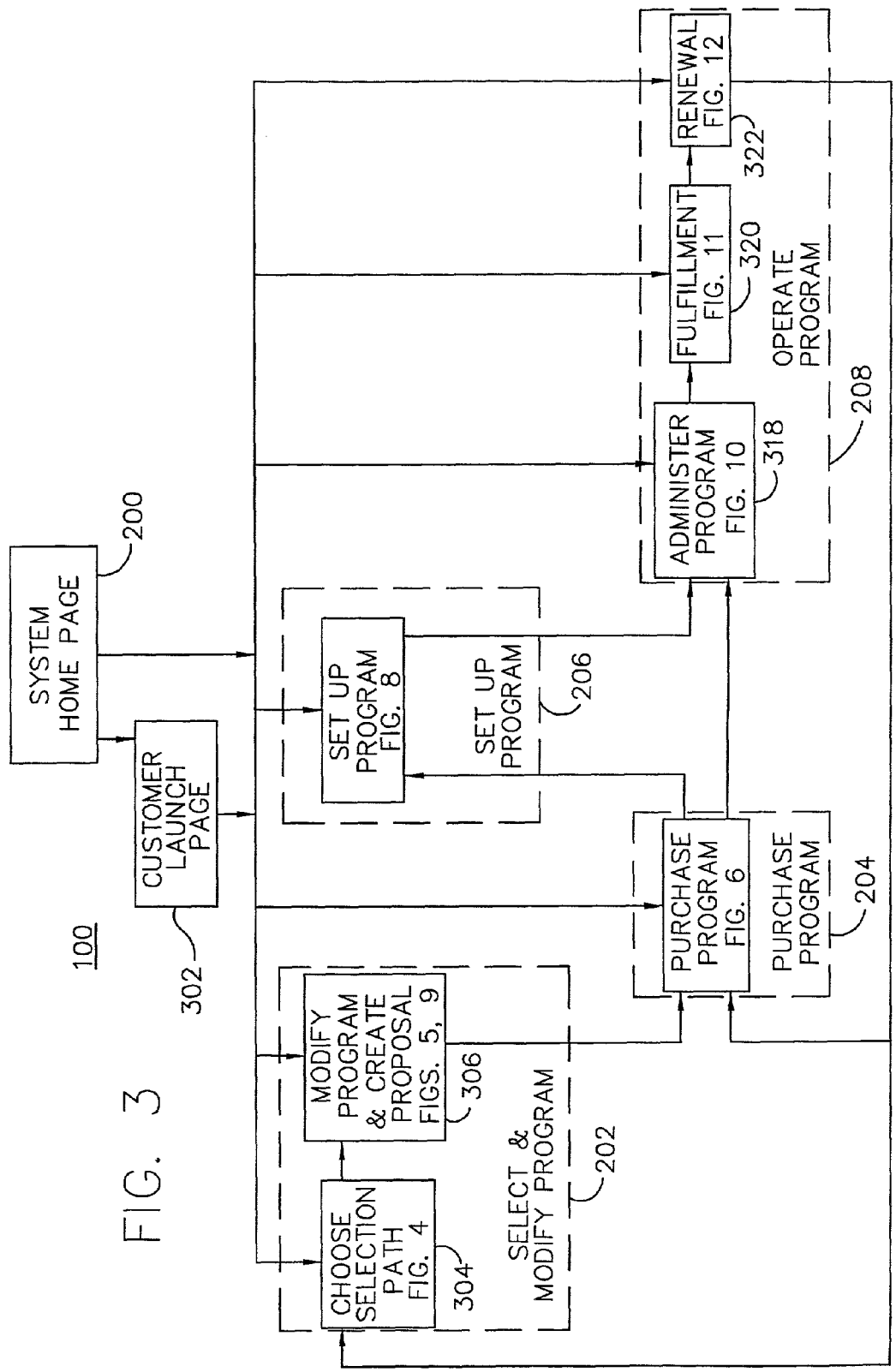
FIG. 3 is a detailed block diagram of one preferred embodiment of the invention illustrating the main aspects of the system and method.

Referring next to FIG. 3, a detailed block diagram of one embodiment of the invention illustrates the main aspects of the system 100. A shopping cart model, accessible from all locations within the system 100 via global navigation, facilitates customer 118 purchase of programs, awards, and other offerings. The system home page 200 also provides customers 118 who are registered with access to a customer-specific customer launch page 302. The registered customers have saved one or more programs, have purchased programs, or have programs in operation. From the customer launch page 302, the customer 118 can access several functions of the system 100. To select and modify the predefined program 416 at 202, the customer 118 first chooses a selection path at 304. The selection path indicates the way in which the customer 118 would evaluate and select the predefined program 416. The selected program can be modified and the customer 118 creates at 306 an optional, printable proposal (e.g., received via electronic mail) reflecting the modified program 126. The customer 118 can review the proposal on the system 100 and print the electronically mailed proposal for analysis and/or offline decision-making. The customer 118 can then accept the proposal by purchasing the selected program at 204 or making further modifications. The modified program 126 is purchased at 204 and set up at 206. Once launched into operation at 208, operation of the modified program 126 can be administered at 318 by the system 100 generating electronic progress reports at 1014 (FIG. 10) after the customer 118 enters performance data. The electronic progress reports yield data indicating information about activities of the customer's participants 120 within the modified program 126 or management summaries for each program 126. During the program operation, the customer 118 can also renew previous, modified programs at 322 or select at 304 a new program and optionally modify at 306 the program. In addition, from the program management summary pages of a particular customer 118, the particular customer 118 can access a financial summary for each program 126.

The predefined programs 416 have predefined components including, but not limited to, the rules structure and suggested theme and graphics. Customers 118 can modify at 504 these predefined components to achieve the desired modified program 126. Modification of the predefined program 416 may include, but not be limited to, modifying the following components: communications campaign theme and components, number of participants, program duration, available awards, and rules structure. In particular, but not necessarily in this order, customers: (1) select a rules structure for the program, (2) select program duration, (3) accept the recommended award type or choose an alternate award type to be available from the awards collection 124, (4) define the number of participants, (5) determine the award value(s) and/or (6) accept the recommended theme, choose an alternate theme, and/or alter the level of communications campaign to be purchased. Some programs 126 are points-based and the participants 120 choose awards from the awards collection 124 while other programs 126 have designated awards. Elements of the communications campaign include a program home page 1420 containing a theme, graphics, awards photography (modifiable using alternatives from the photo library), and editable text. The customer 118 can also modify the amount of assistance recommended to customers 118 who are unfamiliar with the operation of programs 126 by enabling and disabling "Smart Tips." The "Smart Tips" guide the customer 118 in using the system 100.

Rules structures define the manner in which awards are earned by the participants 120. The customer 118 can select the rules structure to reflect the individual needs of the customer 118. The differing program types have different rules structures.

In one embodiment, the predefined programs 416 are created for the following program types: sales contests, retention strategies, project milestones, service anniversaries, and on-the-spot awards. The sales contests may be based on rules structures such as: Hit and Win, Top Performer, Dollar One, Up To and Over, and Incremental Sales. Each sales contest has multiple themes and supporting graphics. In the Hit and Win rules structure, an objective is set and communicated to drive each participant 120. When the objective is reached, the participant 120 earns the award. In the Top Performer rules structure, participants 120 compete against peers to earn awards. The top performing participants 120, defined as a default or customer-specified number of participants, are considered winners. In the Dollar One rules structure, participants 120 earn awards for every unit or specific dollar amount sold. In the Up To and Over rules structure, each participant 120 is assigned an objective that is specific and achievable. For every dollar or unit sold by a participant 120 up to the objective, that participant 120 earns the first level of awards. Once the objective is achieved, the participant 120 earns at a greater rate. In the Incremental Sales rules structure, each participant 120 is assigned one objective that is specific and achievable. For every dollar or unit sold by the participant 120 over that objective, that participant 120 earns awards. Multiple rules structures may be offered for the retention program type, including: length-of-service milestones, hot skills, and key responsibilities. The rules structure for the length-of-service milestone program type is that each participant 120 receives an appropriate level service anniversary award following a specified length of company service. The on-the-spot program type provides immediate awards of various types to the desired participant. Additional rules structures may be accommodated as appropriate to promote other performance such as participant suggestions, safety, productivity, or presenteeism.

With the performance data entry and report system, customers 118 can enter data and monitor the performance of the participants 120 in the modified program 126. The system 100 generates electronic management summary progress reports for the modified program 126 showing program performance data or individual reports for the participants 120. Customers 118 select the frequency of progress report updates and electronic mail updates by determining the frequency of data entry.

Figure 4:
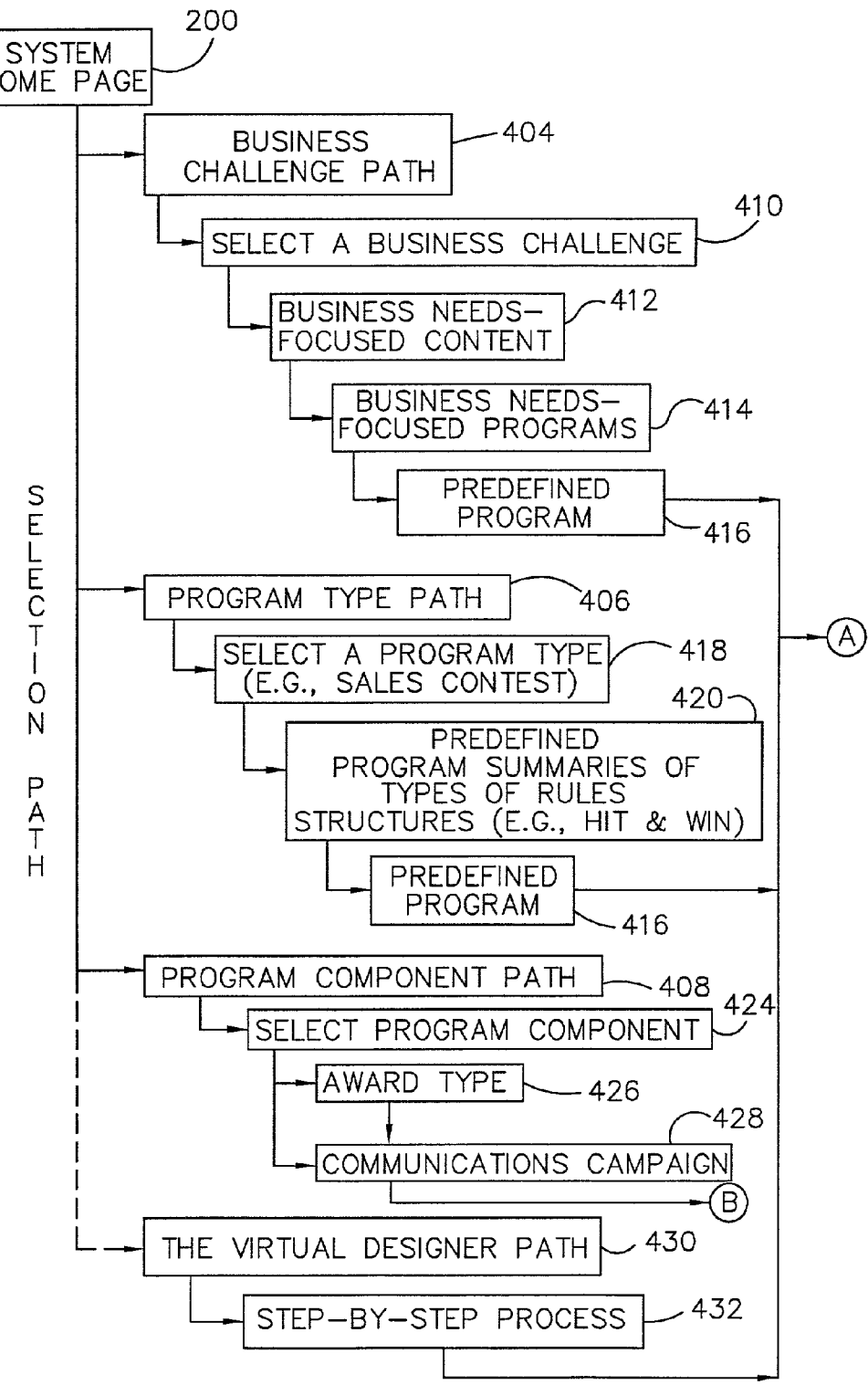
FIG. 4 is a block diagram of an aspect of the invention in which the customer chooses a selection path to obtain a program.

Referring next to FIG. 4, a block diagram of an aspect of the system 100 illustrates the manner in which the customer 118 chooses the selection path at 304 to navigate to a predefined program 416.

On the system home page 200 or other gateway, the customer 118 chooses the selection path: the customers 118 can choose a business challenge path 404 to select from a plurality of business challenges at 410 (e.g., increase sales and revenue, increase profit, improve market share, etc.), the customers 118 can choose a program type path 406 to select from a plurality of program types at 418 (e.g., sales contests, employee-retention programs, service anniversary programs), and the customers 118 can choose a program component path 408 to select from a plurality of program components at 424 (e.g., award type at 426 and the communications campaigns at 428). By selecting a business challenge or program type, the customers 118 reduce the number of predefined programs 416 of the browsable catalog 110 which may be selected. The optional virtual designer path 430 will be described below. The customers 118 can also review information such as case studies, testimonials, third-party articles, white papers and news. Case studies include the documented experiences of other customers 118. The program type path 406 and the award types 426 are also included on a global navigation menu which is accessible from each page within the system 100. Customer feedback tools include surveys distributed to the participants 120. In one embodiment, some of the customers 118 who visit the system 100 and either remain for a certain period of time or navigate to a certain depth will be asked to complete a satisfaction survey that queries the overall appeal of the site and the offering. In another embodiment, at program end, the customer 118 is asked to complete a program-end survey that gauges overall satisfaction with the system 100.

In terms of navigating the system 100, the system 100 allows the customers 118 to move easily from one part of the system 100 to another accommodating multiple experience levels. The customer 118 can choose the program based on business challenges at 404, based on program types at 406, or based on program components at 408. In addition, at 430 the customer 118 can have a program designed in response to feedback from a step-by-step question-based process.

In the first model, under the business challenge path 404, site navigation occurs by choosing the applicable business challenge at 410. The customer 118 is presented with a listing of various business challenges. Sample business challenges include, but are not limited to, increasing sales and revenue, increasing profit, improving market share, attracting and retaining employees, improving employee morale, recognizing service anniversaries, and rewarding project milestones. There are multiple, predefined programs 416 associated with each business challenge. When the customer 118 selects a business challenge at 410, the predefined programs 416 associated with the identified business challenge are presented to the customer 118.

The selected business challenge allows the system 100 to optionally display focused content at 412 that reflects the customer's business needs. The system 100 then delivers focused programs at 414 to the customer 118 that reflect this focused content. After 414, the customers 118 select one predefined program 416 and can purchase without modifying any program components (see FIG. 5 reference character 502), modify the program components (see FIG. 5 reference character 504) and create a proposal or invoice or navigate to other aspects of the system 100.

In the second model, under the program type path 406, the customers 118 can browse at 418 the program types available. The customers 118 can then view the available, predefined programs of that type.

Under the program type path 406, the customer 118 is presented with a listing of the program types at 418. Each program type has a description. After the customer 118 selects at 418 the program type and duration, the customer 118 can then view at 420 a program summary of one or more of the predefined programs 416.

In the third model, the customer 118 prefers to buy specific program components. This program component path 408 allows the customer 118 to select one or more program components at 424. The program components include, but are not limited to, the award type 426 and the communication campaign elements 428. The customers 118 will be able to write the rules structure offline and select the award items and/or communications campaign elements to suit their needs online. The system 100 allows the customers 118 to retain some control over selected program functionality.

In another embodiment of the invention, the virtual designer path 430 leads the customer 118 through a step-by-step process 432 which is a series of grouped questions in a bottom-to-top design process to present the customer 118 with a modified program 126. Questions are provided to each customer 118 via the customer processor 104. Each customer 118 responds via the customer processor 104 to the questions. The responses result in the modified program 126 for the customer 118 with a step-by-step budget. The customer 118 can view the details of the modified program 126, modify the modified program 126 further, and create a proposal and/or invoice with a view of the financial impact of the decisions updated in real-time. The step-by-step budget and real-time financial updating are features available to the customer 118 anytime the customer 118 modifies the modified programs 126. That is, these features are not limited to the virtual designer path 430.

For example, a first series of optional grouped questions results in a recommended rules structure. The first series of grouped questions relates to current performance, desired performance, titles and positions of employees who affect company performance, desired time frame for improving performance, desired methods of improving performance, budget sensitivity, and whether other programs are currently being operated. The recommended rules structure is based on such factors as the recommended number of participants, desired behavior of the recommended participants, frequency of participant monitoring, and program duration.

A second series of grouped questions results in recommended awards. The second series of grouped questions relates to participant age, gender, and compensation, percent of incremental or overall gain realized or dollars budgeted that can be spent on awards, award history, and award preference. The recommended awards include types, number, value, and frequency.

A third series of optional grouped questions results in recommended training. The third series of grouped questions relates to participant skills and knowledge, and the source of such skills, knowledge, and training. The training includes suggesting certain titles of participants recommended for training, the matter to be learned, the form of training, training duration, and the connection to the recommended awards.

A fourth series of grouped questions results in a recommended communications campaign. The fourth series of grouped questions relates to the participants' access to the Internet 102, communications campaign history, and any customer preferences. The recommended communications campaign includes a method (online and/or offline), elements, schedule, theme, and graphics.

A fifth series of grouped questions results in recommended program operation. The fifth series of grouped questions relates to customer preferences for displaying rank, participants, and earnings to all participants 120 or just to each individual participant 120. Further, the fifth series of grouped questions relates to whether the customer 118 wants to enter the participant performance data and allow the program processor 108 to calculate totals, or whether the customer 118 will enter the totals only. In addition, the fifth series of grouped questions relates to whether the customer 118 wants to enter the awards to issue, or let the system 100 calculate awards to issue. The recommended program operation includes frequency, participant performance data entry format, automatic, system-generated customer reminders, and automatic participant performance data updates.

The five series of grouped questions are presented as an illustration only, and are not meant to define the limits or order of questions which may be asked to produce a modified program 126 for the customer 118 based on the customer's responses to the questions.

Figure 5:
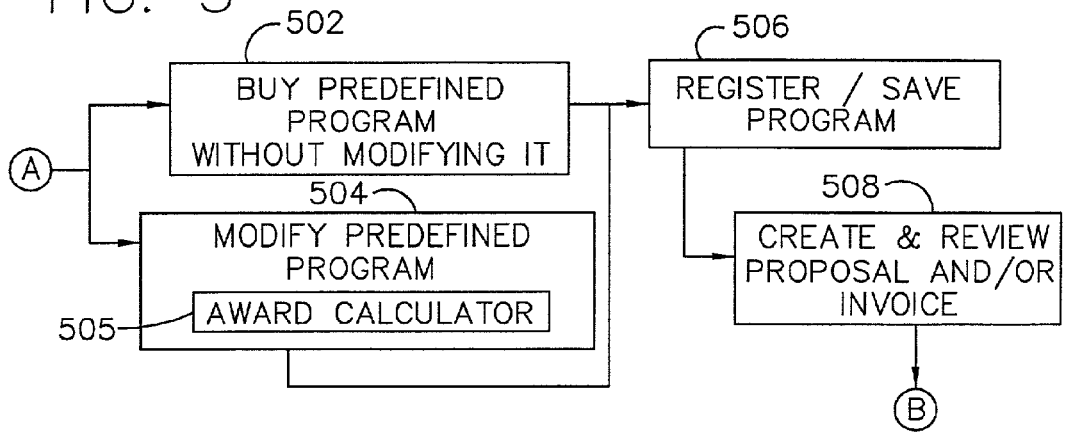
FIG. 5 is a block diagram of an aspect of the system of the invention in which the customer modifies the predefined program, optionally saves the program for future retrieval, and optionally creates a proposal and/or invoice with pricing detail.

Referring next to FIG. 5, a block diagram of an aspect of the invention illustrates the manner in which the customer 118, via a multi-step process, modifies at 504 the components of the predefined program 416, and optionally registers and saves at 506 the modified program 126 for future retrieval. During modification, the customer 118 is given the option to view an award calculator 505. If the award calculator 505 is selected, a pop-up window allows the customer 118 to enter the average salary of the program participants 120. The award calculator 505 calculates an effective, recommended award value based on several factors including the average salary and program duration. In one embodiment, the award calculator recommends the award value for one or more participants responsive to the salary associated with the one or more participants. The customer 118 can then decide whether to use the recommended value or another value. The customer 118 creates at 508 a proposal and/or invoice with pricing detail which can be delivered (e.g., electronically mailed) to the customer 118 for review and offline decision-making. Alternatively, the system 100 directly prints the proposal and/or invoice at the customer's selected print device. The customer 118 can choose to not modify any program components at 502, but only enter basic information such as the number of participants, award values, etc. The proposal and/or invoice reflects the program components of the modified program 126 that the customer 118 has selected. Registering includes providing identifiers that will associate the customer 118 with the modified program 126. The system 100 links the saved program 126 to the customer 118. If the customer 118 chose the program component path 408, then the customer 118 is immediately ready to purchase (FIG. 6) the modifiable program component(s). After saving the modified program 126 at 506, the customer 118 can opt to purchase at 204 the modified program 126.

Figure 6:
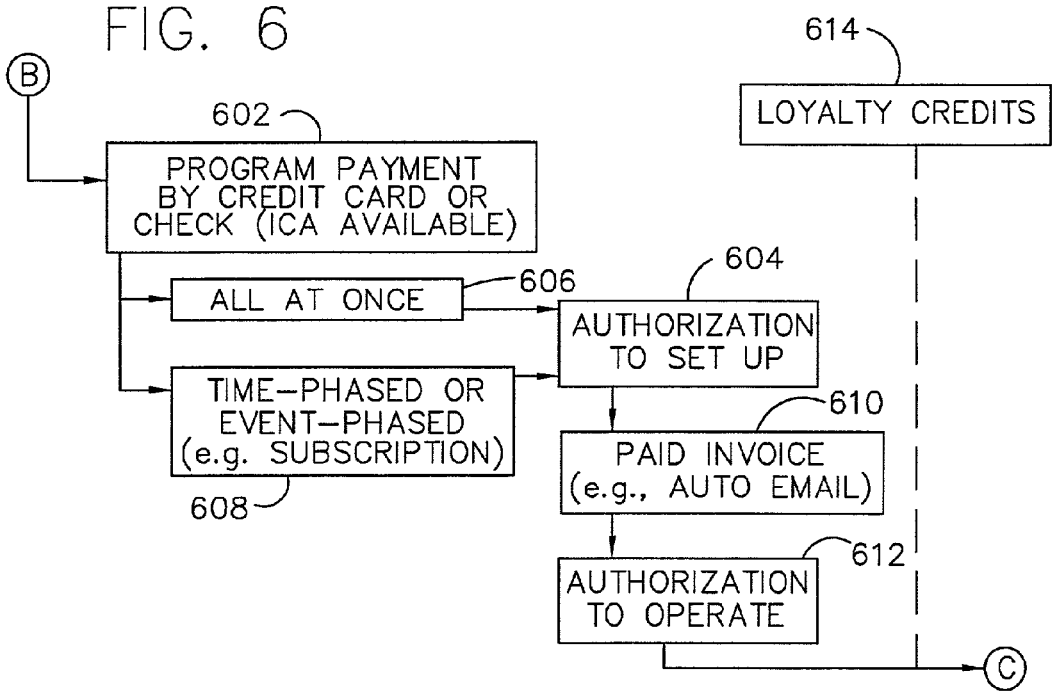
FIG. 6 is a block diagram of an aspect of the system of the invention in which the customer purchases the modified program.

Referring next to FIG. 6, a block diagram of an aspect of the invention illustrates the manner in which the customer 118 purchases the modified program 126. After modifying the program and/or creating the proposal, a fee is assessed relating to the modified program 126. This fee can be assessed electronically via the program processor 108 or the customer processor 104. Alternatively, this fee can be assessed via traditional paper methods of invoicing. In one embodiment, the customer 118 pays this fee at 602 through a debit card, credit card, or via a check. The credit card payment can be accepted online through the customer processor 104. A paid electronic receipt is issued (e.g., as an electronic mail attachment).

To pay via a check, an Internet Check Acceptance (ICA) program is available. The ICA program allows the customer 118 to request and receive an electronic invoice (e.g., as an electronic mail attachment). The customer 118 completes the purchase by providing the routing information of the check which will be used to pay the invoice. After receipt of the routing information of the check, the supplier 130 can electronically cash the check using the provided routing information. Regardless of the status of the check processing, the system 100 may immediately authorize at 604 the customer 118 to begin set up of the modified program 126. The system 100 electronically mails a notification to the customer 118 of the authorization to set up. Alternatively, the notification can be included in the paid receipt. The program start date must follow clearing of the check.

In an alternate embodiment (e.g., for purchases beyond the allowed, online threshold), payment type can be indicated online, payment (credit card number or check) mailed to the supplier 130 and the purchase "released" or authorized by a delegate at the supplier 130. Then, the customer 118 can set up.

The fee for the modified program 126 is paid by the customer 118 all at once at 606, or in payments over time at 608. The all-at-once payment or payments over time may include a subscription service that allows a payment for unlimited access to programs and awards for a "subscribed" period of time. In one embodiment, loyalty credits 614 are issued to repeat customers which can be redeemed by the customer 118 for award items or possibly applied to future program expenses.

After an initial or all-at-once payment has been received, the customer 118 has authorization to operate the program 126. The system 100 communicates at 610 (e.g., electronically mails) a confirmation of the paid invoice to the customer 118 to indicate authorization to the customer 118 to proceed with operation of the modified program 126 at 612.

The system 100 also includes promotion code functionality and alliance tracking. Promotion code functionality allows the customer 118 to take advantage of a special promotional offer made to them. A promotion-code box is included on the system 100 (on one or another of the shopping-cart screens as well as in the various item-quantity order pages where the pricing summaries are presented). If the customer 118 enters a promotion code, the system 100 queries the promotion-code database and determines the terms of the promotion. If all conditions are met, the system 100 automatically applies the terms of the promotion to the customer's purchase (e.g., a dollar or percent discount). If the customer navigated to the system 100 from an affiliated site, the promotion-code box may be auto-populated and the promotion terms automatically applied. The customer 118 can overwrite this code, if desired. In addition, if the customer 118 has logged in and the system 100 recognizes the customer 118 as having been "assigned" to a particular affiliate because of the previous entry of an affiliate's promotion code at the time of a previous purchase, the promotion-code box may be auto-populated and the promotion terms automatically applied.

Alliance tracking allows the system 100 to recognize when the customer 118 has navigated from an affiliate's web site. If this navigation occurs, then the promotion-code functionality as described above is applicable. In addition, alliance tracking includes the ability to track where the customers 118 navigate from the system 100, and the ability to monitor activity to plan for affiliate commission payments, etc.

Figure 7:
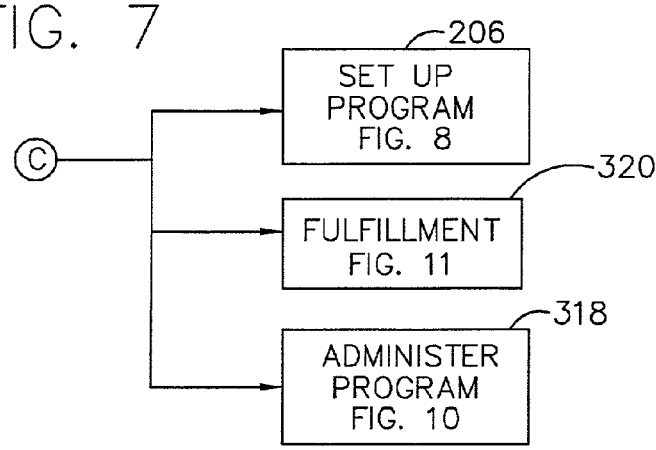
FIG. 7 is a block diagram of an aspect of the system of the invention in which the customer operates the modified program.

Referring next to FIG. 7, a block diagram of an aspect of the invention illustrates the manner in which the customer 118 sets up the modified program 126. The customer 118 can set up at 206 the modified program 126, direct at 320 the shipment of direct purchase program components (e.g., awards and/or communications campaign elements), or administer at 318 the modified program 126.

Referring next to FIG. 8, a block diagram of an aspect of the invention illustrates the manner in which the customer 118 sets up at 206 the modified program 126 including enrolling the participants 120, setting at 804 program and/or participant objectives and program start/end dates, and editing the communications campaign at 806. Set up includes the customer 118 enrolling participants 120 at 808 in the modified program 126 by inputting their electronic mail addresses and names online or by selecting participant self-enrollment. Other methods for enrolling participants 120 include copying and pasting from an offline source (e.g., spreadsheet) or downloading an electronic data file from the customer's database. The inputting occurs in various ways, including via the customer processor 104. Alternatively, the participants 120 can enroll themselves at 810 via the participant processor 106 without the aid of the customer 118 (other than the initial set-up instructions). In another alternative embodiment, the customer 118 selects participants 120 for enrollment from an extant database of participants 120 who either have been enrolled in previous modified programs 126 or are currently enrolled in other modified programs 126 of the customer 118. In one embodiment, set up occurs in the transaction system which comprises either or both the customer processor 104 and the participant processor 106.

Program objectives are outlined by the customer 118 at 804 in the modified program 126. Among other things, program objectives reflect participant performance desired by the customer 118.

The customer 118 also sets up at 806 the communications campaign elements of the modified program 126. The communications campaign elements include, but are not limited to, a theme and graphics 812, announcement 814, program home page 1420 editing at 816, and follow-up promotions (generally electronic mails) at 818.

In setting up the communications campaign elements at 806 and throughout program operations, the customers 118 can personalize the elements selected prior to purchase. For example, the customers 118 can change the photography, edit the copy, and/or change the automatically suggested electronic mail dates of the elements. The customers 118 choose to have the communications delivered electronically as electronic mails (to the customer 118 or individual program participants) or select elements that can be printed by the customer 118 from the program processor 108. The frequency and some format elements of data collection and calculation can be modified. The impact of any of the modifications is displayed automatically in real-time.

The customer 118 enters at 820 participant performance data and options for generating reports. The performance data can be entered by the customer online manually, or by copying and pasting from an offline source such as a spreadsheet or by electronically downloading data from the customer's file. The options include, but are not limited to, selecting whether or not to display a ranked list of all participants 120 to individual participants 120. Set up at 206 further includes directing at 826 communications to the customer 118 only (for forwarding to participants) or to the customer 118 and the participants 120. The customer also can modify at 828 the dates for sending communications to participants.

Referring next to FIG. 9, a block diagram of an aspect of the invention illustrates awards selection at 906 by the customer 118. During program modify at 306, customers 118 can select at 906 award items that will be available to the participants 120 from the awards collection 124. Example award categories include award points 904, merchandise 908, merchandise with logos 922, individual 910 or group 916 travel, stored-value (filtered) debit cards 912, gift certificates 914, plaques/trophies or recognition certificates 918, or special featured offers 920. The award points 904 includes at least two indices: a step-up collection and a one-half cent index. For the step-up collection option of the award redemption catalog, the selection of the award items is presented in sequential levels of points required to redeem for the award items. Each level features eight to ten award items. The participants 120 select any combination depending upon the award points 904 available to that participant 120. In one embodiment, seven levels are offered (1, 2, 3, 4, 6, 8 and 10). The award point requirement is inclusive of shipping and taxes. The customers 118 pay a pre-set amount of money for each point of this type. For example, for the one-half cent index, the customer 118 purchases award points at one-half cent plus a percentage fee where the percentage fee is invisible to the participant 120. Based on which type of award the customer 118 purchases, the system 100 automatically displays the correct award selection and index.

In modifying award options, customers 118 can select from many individual award items or pre-grouped award items (e.g., grouped by lifestyle, price, program type, etc.). In one embodiment, the number of available award items exceeds two thousand. The award items can be pre-selected and shipped directly to the customer 118 (e.g., for display during program operation). Special featured offers 920 for the customers 118 are also available. These offers 920 include special award items available only to the customer 118 for purchase.

Private-label travel award items 910, 916 of varying varieties are available as the award items. Customers 118 can pre-select a value and destination of the travel award from a limited offering of group trips, or they can select certificates of a given value and let the individual participants 120 book the travel award items. Online and offline travel booking services are available with online service access available transparently through the system 100. Further, the filtered debit card 912 (a sort of plastic "gift certificate") is good at many online and offline retailers and travel providers.

Participants 120 who have earned award points 904 are provided access to the browsable, online award redemption catalog from which award points 904 can be redeemed. Participant 120 access to the award redemption catalog occurs via the participant processor 106. The participant processor 106 can be part of the transaction system 100 which can be a computer connected to a global computer network such as the Internet 102.

Referring next to FIG. 10, a block diagram of an aspect of the invention illustrates the manner in which the customer 118 administers at 318 the operation of the modified program 126. Logging in from a "button" on the system home page 200, the system takes the customer 118 directly to the program 126 to be administered (single modified program 126) or to the customer launch page 302 (multiple modified programs 126, saved data, etc.) from which a single program 126 can be selected. From the single program page, the customer 118 can enter participant performance data to provide a performance update, designate the distribution of the award items and/or allocate in-program and/or discretionary award points 904 to each participant 120. The program processor 108 calculates participant rankings, award allocations, and/or other information based on the rules structures and the selected award items. After reviewing the calculations performed by the program processor 108 in response to the participant performance data, the customer 118 accepts the calculations before authorizing award point deposit and issuing payment to purchase the awards. Not all rules structures require that performance data be entered. When no performance data is entered, the step of calculating is omitted. In either case, the participants 120 are notified that performance, awards, or rank has been updated. The options available during program administration can be modified for ease of use by the customer 118. For example, various columns of text can be viewed or hidden at the discretion of the customer 118.

The customer 118 also enters or otherwise manages at 1004 performance data for the participants 120 which automatically updates electronic progress reports at 1014. The electronic progress reports generated by the program processor 108 indicate various information about the modified program 126 including, but not limited to, actual performance by the individual participants 120 as well as management summaries. The customer 118 can monitor the performance of each participant 120 in the modified program 126. The customer 118 also accepts at 1016 allocation of awards to the participants 120 who qualify for awards. The customer 118 then purchases at 1018 the awards that have been allocated and the participants 120 are notified of the purchased awards. Purchasing after allocation is referred to as "pay-as-you-go." The customers 118 pay for the awards only after the customer 118 has accepted the award allocation.

The customer 118 can perform various other functions not available to the participants 120 including, as required by the specific rules structures, sales data entry, award point issuance (in-program and discretionary or bonus) and approval (as appropriate), invoicing updates, and participant 120 enrollment/objective changes. The customer 118 can revise the setup at 1006 or the communications campaign at 1008 of the modified program 126 as often as desired prior to the electronic mailing of any communications component. A delivery center such as an electronic mail center 1002 allows the customer 118 at 1006 to personalize follow-up promotions 1010 and schedule and launch at 1012 communications cycles by editing the content and frequency of any communications that are scheduled to be sent by the program processor 108. The communications can be electronic or paper-based.

The operating software 122 notifies the customers 118 via electronic mail when the modified program 126 requires operational maintenance. The operational maintenance can include, for example, an update of the participant performance data, or an announcement 814 of upcoming program termination.

Referring next to FIG. 11, a block diagram of an aspect of the invention illustrates award fulfillment at 320. If the participant is enrolled in a program based on award points and after the participant 120 requests an award item to be redeemed for award points 904, the participant 120 purchases at 1103 the earned, requested awards via a shopping cart. The shopping cart allows the participant 120 to select requested awards for purchase and view the financial impact of the selection updated in real-time. Before the award item is sent to the participant 120 at 1104, the participant 120 is given shipping information at 1102.

Figure 12:
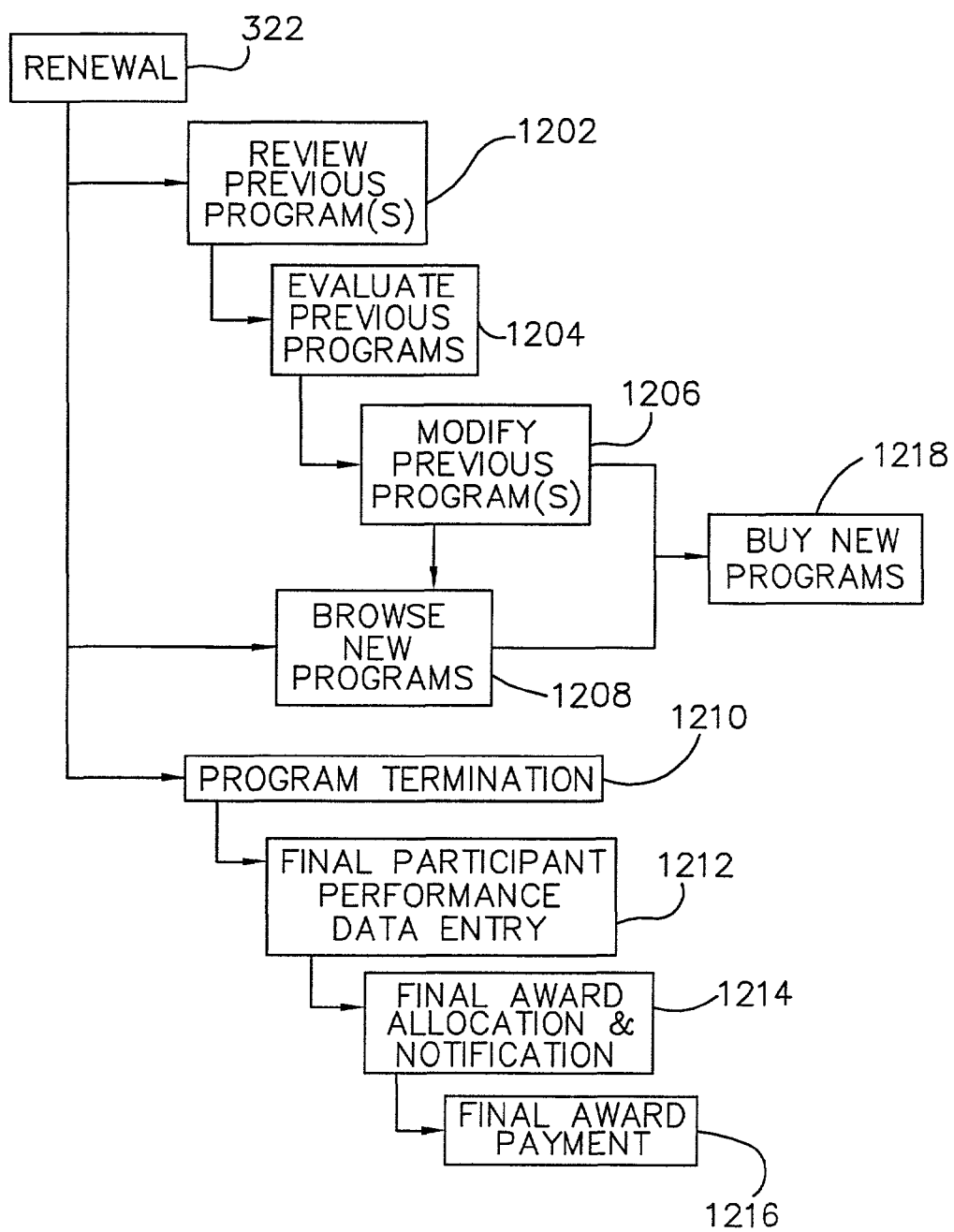
FIG. 12 is a block diagram of an aspect of the system of the invention illustrating modified program termination and renewal.

Referring next to FIG. 12, a block diagram of an aspect of the invention illustrates renewal 322 and termination 1210 of the modified program 126. The customer 118 can renew at 322 operation of previous modified programs. To renew operation of a previous modified program, the customer 118 is provided with electronic access via the customer processor 104 to a browsable catalog of previous modified programs of that customer 118 stored in the storage device 112. Each customer 118 selects via the customer processor 104 one of the previous modified programs to renew. The customer 118 reviews at 1202 and evaluates at 1204 the program components of the previous modified program. The customer 118 can also modify at 1206 elements of the previous modified program, or browse at 1208 other predefined programs 416. After modifying or browsing, the customer 118 can then purchase at 1218 the selected program and access other functionality of the system 100.

In response to a predetermined event, operation of the modified program 126 terminates at 1210. This predetermined event can be expiration of the program duration, cancellation of the modified program 126 by the customer 118, or cancellation of the modified program 126 by the supplier 130.

When the modified program 126 terminates at 1210, the customer 118 performs termination activities such as optionally entering final participant performance data 1212, optionally allocating final awards 1214, and making any final award payment 1216 to the supplier 130 as necessary.

Figure 13:
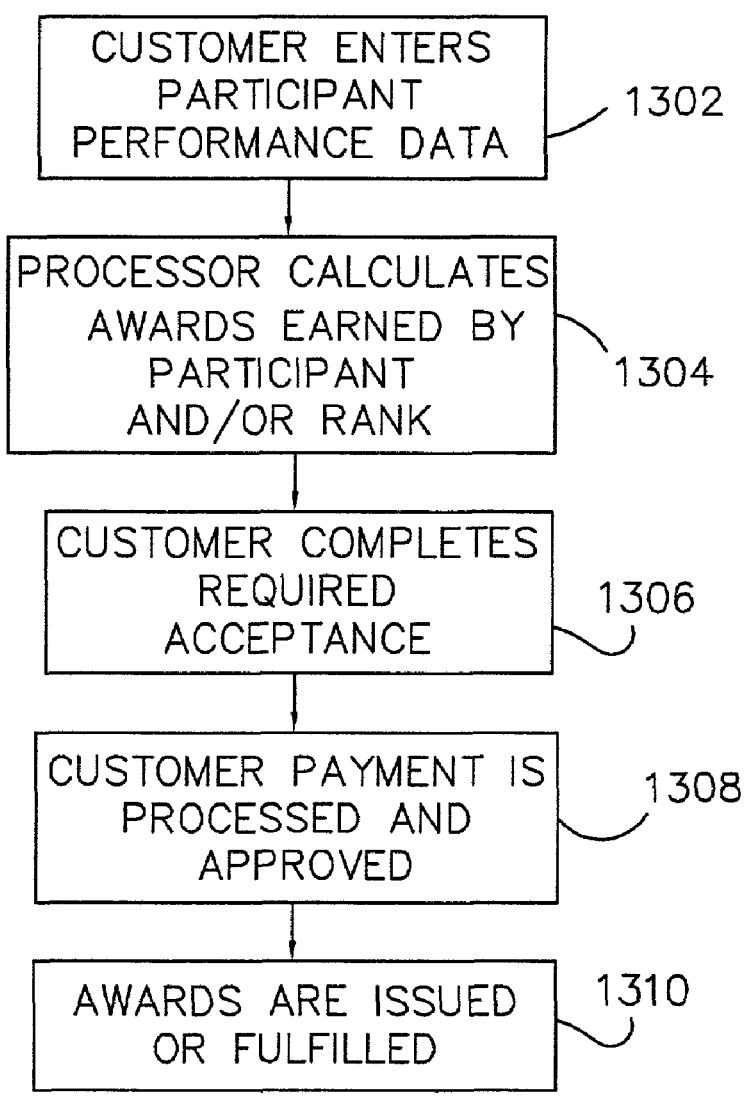
FIG. 13 is a flow chart of the method and system according to the invention in which the customer enters performance data, allocates awards, and purchases awards for participants in the modified program.

Referring next to FIG. 13, a flow chart of the system 100 according to the invention illustrates a manner in which the customer 118 enters participant performance data in the modified program 126 and then allocates and buys awards. Not all rules structures operate according to FIG. 13. The customer 118 enters participant performance data at 1302, and allows the program processor 108 to calculate at 1304 the awards earned by the participants 120 and/or the rank for each participant 120. Alternatively, for the modified programs 126 that include the award points 904, the customer 118 can assign discretionary or bonus award points 904 to each participant 120 directly. After accepting the transaction at 1306, the customer's payment is processed and approved at 1308. The awards are then issued or fulfilled at 1310. Customers 118 also have the shopping cart for use with direct-purchase awards.

Figure 14:
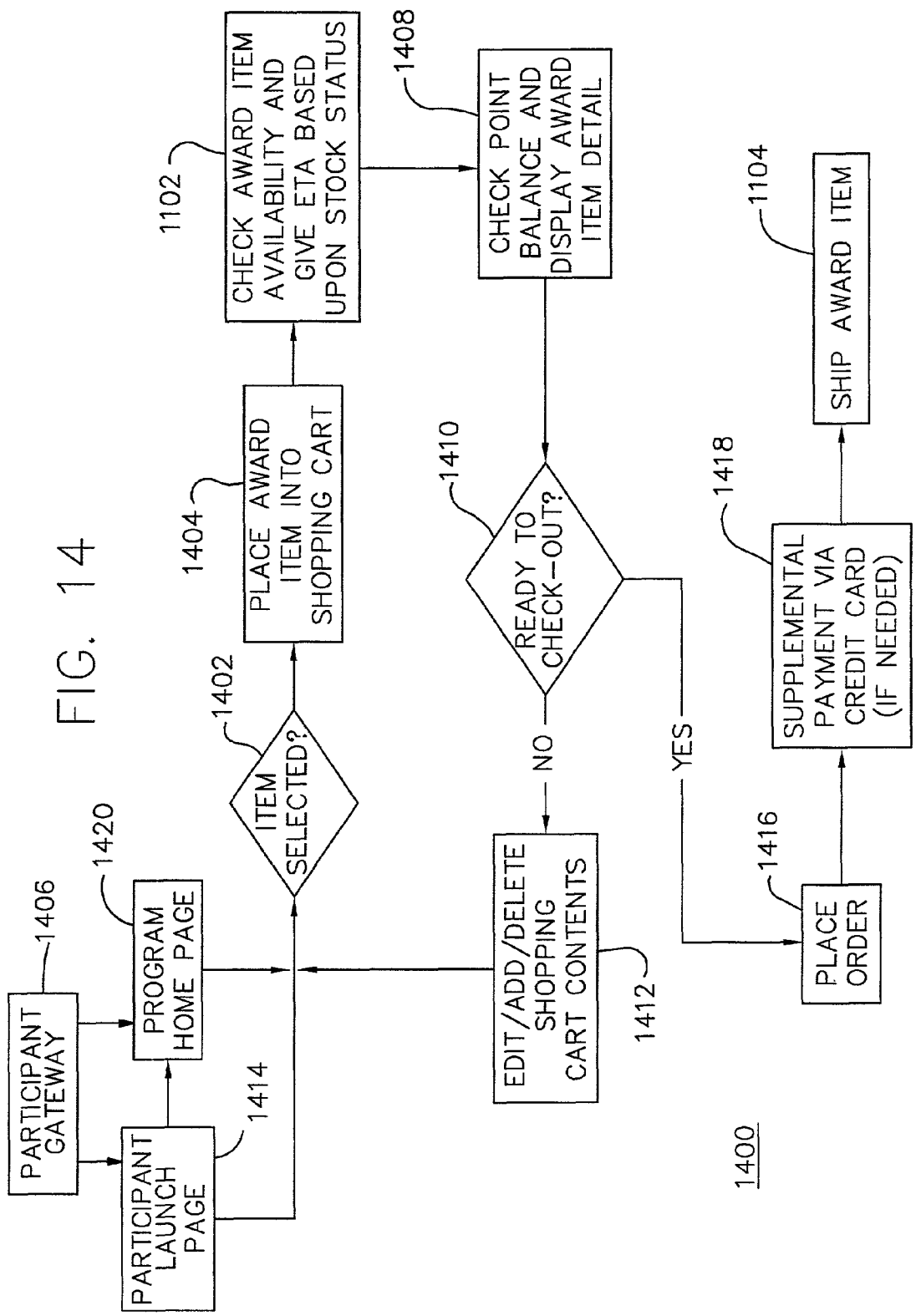
FIG. 14 is a flow chart of the participant experience with the system of the invention in which award points are the award type selected by the customer and the participant browses the award redemption catalog and redeems award points for award items.

Referring next to FIG. 14, a flow chart illustrates the participants' experience 1400 with the invention in which award points 904 are the award type selected by the customer and the participant browses the award redemption catalog and redeems award points 904 for award items (if applicable). There are other participant experiences when other types of awards are used. In FIG. 14, the participants 120 browse the award redemption catalog and redeem award points 904 for the award items (if applicable). The participant 120 accesses the system 100 through a participant gateway 1406. The participant gateway 1406 directs the participant 120 to either the program home page 1420 or a participant launch page 1414 from either of which the participant 120 can, among other actions, browse the award redemption catalog. As the participant 120 browses the award redemption catalog, the award items are selected at 1402 and placed at 1404 into the shopping cart. The participant 120 can also add or delete award items at 1412 from the shopping cart. Detailed information about the selected award items is also communicated at 1408 to the participant 120. The availability and the estimated shipping information for each item in the shopping cart are determined and communicated at 1102 to the participant 120. In one embodiment, the award item information is displayed visually to the participant 120. A total point value of the selected award items in the shopping cart is compared at 1408 to the award point balance of the participant 120 to ensure that sufficient award points 904 exist for award redemption. If the sufficient award points 904 do not exist, the participant 120 is notified and can supplement payment at 1418 with a debit or credit card.

Once the participant 120 has completed shopping at 1410, the redemption request is placed at 1416. The selected award items are then shipped at 1104 to the participant.

The participant experience 324 also includes logging on to the system 100 via a participant gateway 1406. If the participant 120 is enrolled in only one modified program 126, the system 100 directs the participant 120 to the program home page 1420. If the participant 120 is enrolled in more than one modified program 126, the system 100 directs the participant 120 to the participant launch page 1414 which displays all modified programs available to that participant 120. From the program home page 1420, the participant 120 can view the rules structure, start/end dates, progress reports, and other facts related to the modified programs 126. If the participant 120 has points available in a points-based modified program 126, the participant 120 can also view an earnings statement and navigate to shop for award items. For expired programs, access to shopping differs.

In an alternate embodiment, a wish list provides participants 120 with the ability to shop the award redemption catalog, make selections, and order directly from the wish list at a later date. Participants 120 are given one unique wish list for their account 128. The selected award items are posted to the wish list inclusive of the award points 904 requirement for the selected award items as well as shipping and handling. Participants 120 can buy the selected award items from the wish list or simply remove them without purchase.

The customer 118 can also elect to purchase the award items directly. No award points 904 or participant 120 enrollment are required for this form of purchase.

In operation, the invention comprises the system 100 for allowing multiple customers 118 to each select at 304, modify at 306, purchase at 204, set up at 206 and operate at 208 individual motivation or recognition programs. Participants 120 access a participant gateway 1406 on the system 100 via a customer identifier and a personal password. The look and feel of the displayed program home page(s) 1420 corresponds to customer-selected preferences. The participant launch page 1414 is a standard template with themes driven by eligible programs. For the modified programs 126 that do not have participants 120 enrolled yet, the customer 118 is given a generic customer identifier and generic password to give to participants 120. For such modified programs 126, participants 120 can see the program home page 1420 but cannot view any personal progress information or the award point account 128 information until they change the generic identifiers to create a unique identity and the customer 118 completes the enrollment process. Once the participant 120 enrolls, the customer 118 is notified by electronic mail. The customer 118 must enter any additional information required for operation of the modified program 126 (e.g., the participant's program objective). After the customer 118 enters the additional required information (if any), the participant 120 is notified and can view personal information.

In one embodiment, the predefined programs 416 are created for the following program types: sales contests, retention strategies, project milestones, service anniversaries, and on-the-spot awards. Predefined programs 416 are selected through the business challenge path 404 and the program type path 406. Predefined programs 416 selected through the business challenge path 404 are based on a business challenge (e.g., the customer 118 wants to increase sales). Predefined programs 416 selected through the program type path 406 are based on the rules structure (e.g., the customer 118 wants to compare the rules structures of the sales contests).

The predefined programs 416 accessible through the business challenge path 404 are also accessible through the program type path 406. For example, a "Hit and Win" predefined program is associated with the sales contests program type as well as the following business challenges: increase sales and revenue, increase profits, and improve market share.

In a first example modified program, the rationale is to focus the efforts of a particular customer's participants on an inventory unit that is about to be replaced with a more current model. The goal is to sell more of the old inventory units, increase revenue, and decrease outdated inventory risk.

The rules structure associated with the first example modified program awards participants 120 one hundred award points 904 for every unit or specific dollar amount sold in a three-month time period. The award point value assigned to each inventory unit reflects a percentage of an incremental profit margin that will be realized upon these new sales.

The communications campaign associated with the first example modified program includes the theme and graphics to engage the participants. The theme is "Championship Season" which focuses participants 120 on reaching their highest level of achievement in a certain time period. The graphics include a variety of sports images.

In selecting the award items to be associated with the first example modified program, the value of the award items must be considered. If the value of a particular award is too low, salespeople will not be motivated to achieve. If the value of the particular award is too high, the cost of the modified program 126 may be cost-prohibitive.

In a second example modified program, the rationale is to set and communicate objectives to drive specific behaviors for the particular customer's salespeople. To exceed a sales plateau, extra focus is placed on challenging yet attainable objectives with meaningful award items. It is imperative that the objectives be attainable to prevent apathy over an inability to obtain the award items.

The rules structure associated with the second example modified program is that when objectives for a particular participant are reached, the particular participant earns the award.

The communications campaign associated with the second example modified program is centered around a "Winners Take All" theme. Upon hitting the assigned objective, each particular participant will earn a set of golf clubs in a travel bag with balls and a putting video.

The invention also offers the customer 118 information tangential to the modified programs 416 to further educate and inform. This tangential information includes industry white papers, articles and access to live "expert" consultants. Further, links to expert editorial are offered. Each time the predefined programs 416 are provided, this information will be offered in the form of "Smart Tips."

Prior to purchase, terms and conditions are offered to and must be accepted by the customer 118. Once the customer 118 purchases at 204 a predefined program 416, the predefined program 416 must be set up at 206. A step-by-step process leads the customer 118 through each step for clarification and ease of set-up.

During the step-by-step process, the customer 118 is provided with personalization instructions on the system 100. The personalization instructions include, but are not limited to, a template based on the selected communications campaign elements and fields for the start date of operation of the modified program 126, and for enrollment of the participants 120 and entry of their electronic mail addresses. The end date is calculated automatically by the system 100. Some required fields will be identified by the program type. If required fields are not complete when the customer 118 submits the form, the form will be returned with missing required fields highlighted.

Before beginning operation of the modified program 126, the customer 118 can choose to have the supplier 130 manage the electronic mailing of the promotions. For each promotion, the customer may receive a reminder a preset number of days prior to the date of delivery to the participants 120 or the customer 118 only. The customer 118 may modify the promotion at 814 at this time. The program processor 108 will electronically mail the promotion to the participants 120 if the participants' electronic mail data has been entered. The program processor 108 will electronically mail the customer 118 when progress report data needs to be entered. The program processor 108 will electronically mail the participants 120 to recommend viewing of newly entered data on the electronic progress reports. The supplier 130 will electronically mail winner's announcements to the participants 120, as appropriate.

An Expert Consulting service is available within the system 100. The Expert Consulting service provides expert consulting to prospective and current customers via electronic mail or telephone appointments scheduled to accommodate customer requests. Actual appointment time scheduling with expert consultants can be manually handled by a designated customer service representative. Alternatively, actual appointment time scheduling with expert consultants can be performed electronically via the system 100.

The Expert Consulting feature may include, but is not limited to, an explanation of services, a request to set appointment, a request to cancel appointment, and direct access to terms and conditions. In one embodiment, the appointment setting process is as follows: the customer 118 completes the Expert Consulting Request Form including electronic mail address, telephone number, preferred appointment date, first preferred appointment time, second preferred appointment time, company information, and credit-card information. Completion of the optional company information gets the customer 118 a predetermined number of minutes of free Expert Consulting preparation time per call. The request maps to the specialist in charge of setting appointments. Alternatively, the system checks available time and auto-schedules the appointment. The available date and time are electronically mailed to the customer 118. The customer 118 must respond to the electronic mail to confirm. Twenty-four hours prior to the day of appointment and at 5:00 a.m. on the appointment day, the system 100 automatically sends a reminder to the customer 118 specifying the date and time of the appointment and confirming that the Expert Consultant will place the call. Cancellations are not accepted less than twenty-four hours prior to the appointment or else full charges apply. The credit card of the customer 118 is charged when the call is completed or three attempts are made to complete the scheduled call. The Expert Consultant will confirm on the system 100 that the call was completed. Expert Consultants are provided with likely scenarios and consulting guidelines (what can and cannot be suggested). The customer 118 can request a specific Expert Consultant. The system 100 can schedule Expert Consultant appointments per specialized field (e.g., automotive, high-tech, etc.).

In general, the method of the invention allows multiple customers 118 to each create an individual, modified motivation or recognition program 126 having participants 120, each said program 126 permitting the participants 120 to earn awards on the basis of the participants' performance, each said program 126 of a particular customer 118 operating according to preferences selected by the particular customer 118, said method comprising the steps of:

allowing each customer 118 to electronically access via a customer processor 104 a browsable catalog 110 of predefined programs 416 stored in a storage device 112;

allowing each customer 118 to electronically select at 304 via the customer processor 104 one of the predefined programs 416 stored in the storage device 112;

allowing each customer 118 to electronically modify at 306 via the customer processor 104 at least one component of the selected predefined program 416;

allowing each customer 118 to electronically store at 506 via the customer processor 104 the modified program 126 in the storage device 112 for access by such customer 118;

allowing each customer 118 to operate at 208 the modified program 126; and providing each customer's participants 120 with access at 324 via a participant processor 106 to the modified program 126 stored in the storage device 112.

While particular embodiments of the invention have been shown and described, it will be obvious to those skilled in the art that various changes and modifications may be made without departing from the present invention in its broader aspects. It is intended that all matter contained in the above description and shown in the accompanying drawings shall be interpreted as illustrative and not in a limiting sense.

What is claimed is:

1. A method for allowing a first customer to create an individual, modified motivation or recognition first program having first participants, said first program permitting the first participants to access the first program via first participant processors and to earn awards through the first program on the basis of the first participants' performance, said first program of the first customer operating according to preferences selected by the first customer, said method for allowing a second customer to create an individual, modified motivation or recognition second program having second participants, said second program permitting the second participants to access the second program via second participant processors and to earn awards through the second program on the basis of the second participants' performance, said second program of the second customer operating according to preferences selected by the second customer, said method comprising the steps of:

allowing the first customer to electronically access via a first customer processor a browsable catalog of predefined programs stored in a storage device connected to a program processor;

allowing the first customer to electronically select via the first customer processor a first one of the predefined programs stored in the storage device;

allowing the first customer to electronically modify via the first customer processor at least one component of the selected first predefined program;

allowing the first customer to electronically store via the first customer processor the modified first program in the storage device for access by the first customer;

said method further comprising the steps of:

allowing the second customer to electronically access via a second customer processor the browsable catalog of predefined programs stored in the storage device connected to the program processor;

allowing the second customer to electronically select via the second customer processor a second one of the predefined programs stored in the storage device;

allowing the second customer to electronically modify via the second customer processor at least one component of the selected second predefined program;

allowing the second customer to electronically store via the second customer processor the modified second program in the storage device for access by the second customer;

said method further comprising the steps of:

allowing the first customer to operate the modified first program via the program processor, and allowing the second customer to operate the modified second program via the program processor, wherein the first and second participant processors and the first and second customer processors are remote from said program processor and remote from the storage device connected to the program processor; and providing the first customer's participants with access via the first participant processors to the modified first program stored in the storage device, and providing the second customer's participants with access via the second participant processors to the modified second program stored in the storage device, said modified first and second programs executed by the program processor.

2. The method of claim 1, wherein awards are earned by each of a group of participants on the basis of the performance of the group.

3. The method of claim 1, wherein the awards are award points, and wherein the providing step comprises the step of electronically providing each customer's participants with access to a browsable catalog of award items which may be obtained by the participant.

4. The method of claim 3, further comprising the step of allowing each customer's participants to electronically redeem the award points for the award items.

5. The method of claim 3, further comprising the step of allowing each participant to view data indicating the amount of the award points of such participant.

6. The method of claim 3, further comprising the step of allowing each participant to view data indicating transactions by such participant.

7. The method of claim 1, wherein the step of allowing each customer to operate the modified program further includes the step of allowing a program processor to generate electronic progress reports for the participants in the modified program indicating program information.

8. The method of claim 1, wherein the browsable catalog of predefined programs has a plurality of business challenges, and further comprising the step of allowing each customer to select one of the business challenges to reduce the number of predefined programs of the browsable catalog which may be selected.

9. The method of claim 1, wherein the allowing each customer to electronically modify includes an award calculator for recommending an award value for one or more participants responsive to an input salary associated with the one or more participants.

10. The method of claim 1, further comprising providing each customer with a notification via the program processor when the modified program requires operational maintenance.

11. A system for allowing multiple customers to each create an individual, modified motivation or recognition program via a customer processor, each said program having participants, each said program permitting the participants to access their program via a participant processor and to earn awards through their program on the basis of the participants' performance, each said program of a particular customer operating according to preferences selected by the particular customer, said system comprising:
   a storage device; and
   a program processor connected to the storage device, said storage device storing a program for controlling the program processor, said program processor operative with the program wherein the participant processor and the customer processor are remote from said program processor and remote from the storage device:
      to electronically provide to each customer access to a browsable catalog of predefined programs stored in the storage device, each program associated with a business challenge;
      to allow each customer to electronically select a business challenge wherein the predefined programs associated with the business challenge are presented to the customer wherein the predefined programs are designed to promote the selected business challenge;
      to allow each customer to electronically select one of the presented predefined programs stored in the storage device;
      to allow each customer to modify at least one component of the selected predefined program;
      to allow each customer to electronically store the modified program in the storage device for access by such customer;
      to allow each customer to electronically create or review a proposal and/or invoice relating to the modified program;
      to allow each customer to operate the modified program; and
      to provide each customer's participants with access to the modified program stored in the storage device, said modified program executed by the program processor.

12. The method of claim 11, wherein the customer specifies a promotion code, and wherein one or more terms associated with the promotion code are applied the purchase by the customer.

13. The system of claim 11, wherein the business challenges include one or more of the following: increasing sales and revenue, increasing profit, improving market share, attracting and retaining employees, improving employee morale, recognizing service anniversaries, and rewarding project milestones.

14. A method for allowing multiple customers to each create an individual, modified motivation or recognition program having participants, said programs of said multiple customers supplied by a program supplier, each said program permitting the participants to access their program via a participant processor and to earn awards through the program in which they participate on the basis of the participants' performance, each said program of a particular customer operating according to preferences selected by the particular customer, said method comprising the steps of:
   allowing a first customer via a first customer processor and allowing a second customer via a second customer processor to electronically access a browsable catalog of predefined programs stored in a storage device connected to a program processor, said storage device and said program processor being remote from said customer processor and remote from said participant processor, wherein the first customer's access and program is independent of the second customer's access and program;
   allowing the first customer and the second customer to each electronically select one of the predefined programs stored in the storage device via their customer processor, wherein the first customer's selection is independent of the second customer's selection;
   allowing the first customer and the second customer to each electronically select via their customer processor a rules structure of the selected predefined program, said rules structure defining the manner in which awards are earned by the first and second customer's participants, wherein the first customer's selection of the rules structure is independent of the second customer's selection of the rules structure and wherein the first customer creates a first modified program and the second customer creates a second modified program;
   allowing the first customer to electronically store the first modified program in the storage device for access by the first customer via the first customer processor;
   allowing the second customer to electronically store the second modified program in the storage device for access by the second customer via the second customer processor;
   allowing the first customer to operate the first modified program via the first customer processor;
   allowing the second customer to operate the second modified program via the second customer processor, wherein the operation of the first modified program is independent of the second modified program; and
   providing the first customer's participants with access via their participant processor to the first modified program stored in the storage device, said modified program executed by the program processor, the first customer's participants earning awards based on the rules structures of the first modified program;
   permitting the second customer's participants with access via their participant processor to the second modified program stored in the storage device, said modified program executed by the program processor, the second customer's participants earning awards based on the rules structures of the second modified program, wherein access by the first customer's participants to the first modified program is independent of access by the second customer's participants to the second modified program.

15. A method for allowing multiple customers to each create an individual, modified motivation or recognition program having participants, said programs of said multiple customers supplied by a program supplier, each said program permitting the participants to access their program via a participant processor and to earn awards through the program in which they participate on the basis of the participants' performance, each said program of a particular customer operating according to preferences selected by the particular customer, said method comprising the steps of:

allowing a first customer via a first customer processor and allowing a second customer via a second customer processor to electronically select a business challenge from a plurality of business challenges, each business challenge associated with one or more predefined programs wherein the predefined programs associated with the business challenge are presented to the customer wherein the predefined programs are designed to promote the selected business challenge, said predefined programs stored in a storage device connected to a program processor, said storage device and said program processor being remote from said customer processor and remote from said participant processor, wherein the first customer's access and program is independent of the second customer's access and program;

allowing the first customer and the second customer to each electronically select one of the presented predefined programs stored in the storage device via their customer processor, wherein the first customer's selection is independent of the second customer's selection;

allowing the first customer and the second customer to each electronically select via their customer processor a rules structure of the selected predefined program, said rules structure defining the manner in which awards are earned by the first and second customer's participants, wherein the first customer's selection of the rules structure is independent of the second customer's selection of the rules structure and wherein the first customer creates a first modified program and the second customer creates a second modified program;

allowing the first customer to electronically store the first modified program in the storage device for access by the first customer via the first customer processor;

allowing the second customer to electronically store the second modified program in the storage device for access by the second customer via the second customer processor;

allowing the first customer to operate the first modified program via the first customer processor;

allowing the second customer to operate the second modified program via the second customer processor, wherein the operation of the first modified program is independent of the second modified program; and providing the first customer's participants with access via their participant processor to the first modified program stored in the storage device, said modified program executed by the program processor, the first customer's participants earning awards based on the rules structures of the first modified program;

permitting the second customer's participants with access via their participant processor to the second modified program stored in the storage device, said modified program executed by the program processor, the second customer's participants earning awards based on the rules structures of the second modified program, wherein access by the first customer's participants to the first modified program is independent of access by the second customer's participants to the second modified program.

* * * * *